United States Patent

[11] 3,571,795

[72] Inventor Shih Y. Tong
Middletown, N.J.
[21] Appl. No. 831,603
[22] Filed June 9, 1969
[45] Patented Mar. 23, 1971
[73] Assignee Bell Telephone Laboratories, Incorporated
Murray Hill, N.J.

[54] RANDOM AND BURST ERROR-CORRECTING SYSTEMS UTILIZING SELF-ORTHOGONAL CONVOLUTION CODES
23 Claims, 30 Drawing Figs.

[52] U.S. Cl. .......... 340/146.1, 235/153
[51] Int. Cl. .......... G08c 25/00, H041 1/10
[50] Field of Search .......... 340/146.1; 235/153, (Tech. Library)

[56] References Cited
UNITED STATES PATENTS
3,303,333 2/1967 Massey .......... 235/153
3,469,236 9/1969 Gallager .......... 340/146.1
3,475,724 10/1969 Townsend, et al. .......... 340/146.1
3,500,320 3/1970 Massey .......... 340/146.1

*Primary Examiner*—Malcolm A. Morrison
*Assistant Examiner*—Charles E. Atkinson
*Attorneys*—R. J. Guenther and Kenneth B. Hamlin

ABSTRACT: Sequences of information, encoded in a self-orthogonal convolution code of rate $(b-1)/b$ and transmitted via a communication channel, are decoded to correct $t$ random errors and bursts of $B$ blocks where each block is $b$ bits in length. The interconnections of the information digit shift registers of the encoder and decoder and their respective parity check digit generating circuits are determined by deriving a difference triangle of order $\lambda=(b-1)t$ and of size $(b-1)(t+1)$, partitioning the rows of the triangle into $b-1$ groups of $t+1$ rows each such that no more than $t$ repetitions of any entry appear in each group, deriving a new difference triangle from each of the $b-1$ groups by inserting $t-2$ zeros at the top of the first column of each group and expanding the column into a difference triangle, and reconstructing each new triangle by multiplying each entry by $B$, and incrementing various entries until each entry of all triangles is different from all other entries of all triangles. The diagonal entries of the resulting triangles determine the interconnections.

INVENTOR
S. Y. TONG
BY R C Lipton
ATTORNEY

FIG. 4A

CONTENTS OF INFORMATION DIGIT SHIFT REGISTER 116

STAGES OF REGISTER

| TIME INTERVALS | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|
| 1 | 0 | | | | | | | | | | | | | | | | | | |
| 2 | 1 | 0 | | | | | | | | | | | | | | | | | |
| 3 | 1 | 1 | 0 | | | | | | | | | | | | | | | | |
| 4 | 1 | 1 | 1 | 0 | | | | | | | | | | | | | | | |
| 5 | 0 | 1 | 1 | 1 | 0 | | | | | | | | | | | | | | |
| 6 | | 0 | 1 | 1 | 1 | 0 | | | | | | | | | | | | | |
| 7 | | | 0 | 1 | 1 | 1 | 0 | | | | | | | | | | | | |
| 8 | | | | 0 | 1 | 1 | 1 | 0 | | | | | | | | | | | |
| 9 | | | | | 0 | 1 | 1 | 1 | 0 | | | | | | | | | | |
| 10 | | | | | | 0 | 1 | 1 | 1 | 0 | | | | | | | | | |
| 11 | | | | | | | 0 | 1 | 1 | 1 | 0 | | | | | | | | |
| 12 | | | | | | | | 0 | 1 | 1 | 1 | 0 | | | | | | | |
| 13 | | | | | | | | | 0 | 1 | 1 | 1 | 0 | | | | | | |
| 14 | | | | | | | | | | 0 | 1 | 1 | 1 | 0 | | | | | |
| 15 | | | | | | | | | | | 0 | 1 | 1 | 1 | 0 | | | | |
| 16 | | | | | | | | | | | | 0 | 1 | 1 | 1 | 0 | | | |
| 17 | | | | | | | | | | | | | 0 | 1 | 1 | 1 | 0 | | |
| 18 | | | | | | | | | | | | | | 0 | 1 | 1 | 1 | 0 | |
| 19 | | | | | | | | | | | | | | | 0 | 1 | 1 | 1 | 0 |
| 20 | | | | | | | | | | | | | | | | 0 | 1 | 1 | 1 |
| 21 | | | | | | | | | | | | | | | | | 0 | 1 | 1 |
| 22 | | | | | | | | | | | | | | | | | | 0 | 1 |
| 23 | | | | | | | | | | | | | | | | | | | 0 |

FIG. 4B

CONTENTS OF CHECK DIGIT SHIFT REGISTER 124

STAGES

| TIME INTERVALS | 5 | 4 | 3 | 2 | 1 |
|---|---|---|---|---|---|
| 19 | 0 | 1 | 0 | 0 | 1 |
| 20 | | 0 | 1 | 0 | 0 |
| 21 | | | 0 | 1 | 0 |
| 22 | | | | 0 | 1 |

FIG. 4C

CONTENTS OF SYNDROME SHIFT REGISTER 128

STAGES OF REGISTER

| TIME INTERVALS | OUTPUT OF PARITY CHECKING CIRCUIT 120 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|
| 1 | | | | | | | | | | | | | | | | | | | |
| 2 | 1 | | | | | | | | | | | | | | | | | | |
| 3 | 1 | 1 | | | | | | | | | | | | | | | | | |
| 4 | 1 | 1 | 1 | | | | | | | | | | | | | | | | |
| 5 | | 1 | 1 | 1 | | | | | | | | | | | | | | | |
| 6 | | | 1 | 1 | 1 | | | | | | | | | | | | | | |
| 7 | | | | 1 | 1 | 1 | | | | | | | | | | | | | |
| 8 | 1 | | | | 1 | 1 | 1 | | | | | | | | | | | | |
| 9 | 1 | 1 | | | | 1 | 1 | 1 | | | | | | | | | | | |
| 10 | 1 | 1 | 1 | | | | 1 | 1 | 1 | | | | | | | | | | |
| 11 | | 1 | 1 | 1 | | | | 1 | 1 | 1 | | | | | | | | | |
| 12 | | | 1 | 1 | 1 | | | | 1 | 1 | 1 | | | | | | | | |
| 13 | | | | 1 | 1 | 1 | | | | 1 | 1 | 1 | | | | | | | |
| 14 | | | | | 1 | 1 | 1 | | | | 1 | 1 | 1 | | | | | | |
| 15 | | | | | | 1 | 1 | 1 | | | | 1 | 1 | 1 | | | | | |
| 16 | | | | | | | 1 | 1 | 1 | | | | 1 | 1 | 1 | | | | |
| 17 | 1 | | | | | | | 1 | 1 | 1 | | | | 1 | 1 | 1 | | | |
| 18 | 1 | 1 | | | | | | | 1 | 1 | 1 | | | | 1 | 1 | 1 | | |
| 19 | 0 | 1 | 1 | | | | | | | 1 | 1 | 1 | | | | 1 | 1 | 1 | |
| 20 | 1 | 0 | 1 | 1 | | | | | | | 1 | 1 | 1 | | | | 1 | 1 | 1 |
| 21 | 1 | 1 | 0 | 1 | 1 | | | | | | | 1 | 1 | 1 | | | | 1 | 1 |
| 22 | 0 | 1 | 1 | 0 | 1 | 1 | | | | | | | 1 | 1 | 1 | | | | 1 |

FIG. 4D

OUTPUT OF MAJORITY LOGIC CIRCUIT 132

| TIME INTERVALS | OUTPUT | |
|---|---|---|
| 19 | 0 | |
| 20 | 1 | CORRECTION |
| 21 | 1 | CORRECTION |
| 22 | 0 | FAILS TO CORRECT |

CONTENTS OF SYNDROME SHIFT REGISTER 248

CONTENTS OF INFORMATION DIGIT SHIFT REGISTER 244

FIG. 5C

OUTPUT OF MAJORITY LOGIC CIRCUIT 252

| TIME INTERVALS | OUTPUT | |
|---|---|---|
| 18 | 0 | |
| 19 | 1 | CORRECTION |
| 20 | 1 | CORRECTION |
| 21 | 1 | CORRECTION |
| 22 | 0 | |

FIG. 6A

| | | | | | | | | | |
|---|---|---|---|---|---|---|---|---|---|
| 1 | | | | | | | | | |
| 1 | 2 | | | | | | | | |
| 2 | 3 | 4 | | | | | | | |
| 2 | 4 | 5 | 6 | | | | | | |
| 1 | 3 | 5 | 6 | 7 | | | | | |
| 1 | 2 | 4 | 6 | 7 | 8 | | | | |
| 1 | 2 | 3 | 5 | 7 | 8 | 9 | | | |
| 1 | 2 | 3 | 4 | 6 | 8 | 9 | 10 | | |
| 1 | 2 | 3 | 4 | 5 | 7 | 9 | 10 | 11 | |
| 1 | 2 | 3 | 4 | 5 | 6 | 8 | 10 | 11 | 12 |

FIG. 6B $T_{(1)}$ =

| | | | | |
|---|---|---|---|---|
| 1 | | | | |
| 3 | 4 | | | |
| 4 | 7 | 8 | | |
| 1 | 5 | 8 | 9 | |
| 2 | 3 | 7 | 10 | 11 |

$T_{(2)}$ =

| | | | | |
|---|---|---|---|---|
| 2 | | | | |
| 4 | 6 | | | |
| 1 | 5 | 7 | | |
| 3 | 4 | 8 | 10 | |
| 2 | 5 | 6 | 10 | 12 |

FIG. 6C $T_{(1)}$ =

| | | | | | | |
|---|---|---|---|---|---|---|
| 0 | | | | | | |
| 0 | 0 | | | | | |
| 1 | 1 | 1 | | | | |
| 3 | 4 | 4 | 4 | | | |
| 4 | 7 | 8 | 8 | 8 | | |
| 1 | 5 | 8 | 9 | 9 | 9 | |
| 2 | 3 | 7 | 10 | 11 | 11 | 11 |

$T_{(2)}$ =

| | | | | | | |
|---|---|---|---|---|---|---|
| 0 | | | | | | |
| 0 | 0 | | | | | |
| 2 | 2 | 2 | | | | |
| 4 | 6 | 6 | 6 | | | |
| 1 | 5 | 7 | 7 | 7 | | |
| 3 | 4 | 8 | 10 | 10 | 10 | |
| 2 | 5 | 6 | 10 | 12 | 12 | 12 |

FIG. 6D $T_{(1)}=$

| | | | | | | |
|---|---|---|---|---|---|---|
| 0 | | | | | | |
| 0 | 0 | | | | | |
| B | B | B | | | | |
| 3B | 4B | 4B | 4B | | | |
| 4B | 7B | 8B | 8B | 8B | | |
| B | 5B | 8B | 9B | 9B | 9B | |
| 2B | 3B | 7B | 10B | 11B | 11B | 11B |

$T_{(2)}=$

| | | | | | | |
|---|---|---|---|---|---|---|
| 0 | | | | | | |
| 0 | 0 | | | | | |
| 2B | 2B | 2B | | | | |
| 4B | 6B | 6B | 6B | | | |
| B | 5B | 7B | 7B | 7B | | |
| 3B | 4B | 8B | 10B | 10B | 11B | |
| 2B | 5B | 6B | 11B | 12B | 12B | 12B |

FIG. 6E $T_{(1)}=$

| | |
|---|---|
| 1 | |
| 3 | 4 |

$T_{(2)}=$

| | |
|---|---|
| 2 | |
| 5 | 7 |

FIG. 6F $T_{(1)}=$

| | | |
|---|---|---|
| 1 | | |
| 3 | 4 | |
| B+3 | B+6 | B+7 |

$T_{(2)}=$

| | | |
|---|---|---|
| 2 | | |
| 5 | 7 | |
| 2B | 2B+5 | 2B+7 |

FIG. 6G $T_{(1)}=$

| | | | |
|---|---|---|---|
| 1 | | | |
| 3 | 4 | | |
| B+3 | B+6 | B+7 | |
| 3B | 4B+3 | 4B+6 | 4B+7 |

$T_{(2)}=$

| | | | |
|---|---|---|---|
| 2 | | | |
| 5 | 7 | | |
| 2B | 2B+5 | 2B+7 | |
| 4B | 6B | 6B+5 | 6B+7 |

FIG. 6H $T_{(1)}=$

| | | | | |
|---|---|---|---|---|
| 1 | | | | |
| 3 | 4 | | | |
| B+3 | B+6 | B+7 | | |
| 3B | 4B+3 | 4B+6 | 4B+7 | |
| 4B+1 | 7B+1 | 8B+4 | 8B+7 | 8B+8 |

$T_{(2)}=$

| | | | | |
|---|---|---|---|---|
| 2 | | | | |
| 5 | 7 | | | |
| 2B | 2B+5 | 2B+7 | | |
| 4B | 6B | 6B+5 | 6B+7 | |
| B | 5B | 7B | 7B+5 | 7B+7 |

FIG. 6I $T_{(1)}=$

| | | | | | |
|---|---|---|---|---|---|
| 1 | | | | | |
| 3 | 4 | | | | |
| B+3 | B+6 | B+7 | | | |
| 3B | 4B+3 | 4B+6 | 4B+7 | | |
| 4B+1 | 7B+1 | 8B+4 | 8B+7 | 8B+8 | |
| B+1 | 5B+2 | 8B+2 | 9B+5 | 9B+8 | 9B+9 |

$T_{(2)}=$

| | | | | | |
|---|---|---|---|---|---|
| 2 | | | | | |
| 5 | 7 | | | | |
| 2B | 2B+5 | 2B+7 | | | |
| 4B | 6B | 6B+5 | 6B+7 | | |
| B | 5B | 7B | 7B+5 | 7B+7 | |
| 3B+9 | 4B+9 | 8B+9 | 10B+9 | 10B+14 | 10B+16 |

FIG. 6J $T_{(1)}=$

| | | | | | | |
|---|---|---|---|---|---|---|
| 1 | | | | | | |
| 3 | 4 | | | | | |
| B+3 | B+6 | B+7 | | | | |
| 3B | 4B+3 | 4B+6 | 4B+7 | | | |
| 4B+1 | 7B+1 | 8B+4 | 8B+7 | 8B+8 | | |
| B+1 | 5B+2 | 8B+2 | 9B+5 | 9B+8 | 9B+9 | |
| 2B+1 | 3B+12 | 7B+13 | 10B+13 | 11B+16 | 11B+19 | 11B+20 |

$T_{(2)}=$

| | | | | | | |
|---|---|---|---|---|---|---|
| 2 | | | | | | |
| 5 | 7 | | | | | |
| 2B | 2B+5 | 2B+7 | | | | |
| 4B | 6B | 6B+5 | 6B+7 | | | |
| B | 5B | 7B | 7B+5 | 7B+7 | | |
| 3B+9 | 4B+9 | 8B+9 | 10B+9 | 10B+14 | 10B+16 | |
| 2B+6 | 5B+15 | 6B+15 | 10B÷15 | 12B+15 | 12B+20 | 12B+22 |

FIG. 6K

| | | | | | | | | | | | | | |
|---|---|---|---|---|---|---|---|---|---|---|---|---|---|
| 1 | | | | | | | | | | | | | |
| | 2 | | | | | | | | | | | | |
| | | 4 | | | | | | | | | | | |
| | | | 7 | | | | | | | | | | |
| | | | | B+7 | | | | | | | | | |
| | | | | | 2B+7 | | | | | | | | |
| | | | | | | 4B+7 | | | | | | | |
| | | | | | | | 6B+7 | | | | | | |
| | | | | | | | | 7B+7 | | | | | |
| | | | | | | | | | 8B+8 | | | | |
| | | | | | | | | | | 9B+9 | | | |
| | | | | | | | | | | | 10B+16 | | |
| | | | | | | | | | | | | 11B+20 | |
| | | | | | | | | | | | | | 12B+22 |

FIG. 6L

| | | | | | | | T(1) | T(2) |
|---|---|---|---|---|---|---|---|---|
| 1 | | | | | | | √ | |
| 1 | 2 | | | | | | | √ |
| 2 | 3 | 4 | | | | | √ | |
| 3 | 5 | 6 | 7 | | | | | √ |
| B | B+3 | B+5 | B+6 | B+7 | | | √ | |
| B | 2B | 2B+3 | 2B+5 | 2B+6 | 2B+7 | | | √ |
| 2B | 3B | 4B | 4B+3 | 4B+5 | • | • | √ | |
| 2B | 4B | 5B | 6B | • | • | • | | √ |
| B | 3B | 5B | • | • | • | • | | √ |
| B+1 | 2B+1 | • | • | • | • | • | √ | |
| B+1 | 2B+2 | • | • | • | • | • | √ | |
| B+7 | 2B+8 | • | • | • | • | • | | √ |
| B+4 | 2B+11 | • | • | • | • | • | √ | |
| B+2 | 2B+6 | • | • | • | • | • | | √ |

FIG. 6M $T_{(1)}$ =

| | | | |
|---|---|---|---|
| 1 | | | |
| 3 | 4 | | |
| B + 3 | B + 6 | B + 7 | |
| 3B+4 | 4B+7 | 4B+10 | 4B+11 |

FIG. 6N $T_{(1)}$ =

| | | | | | | |
|---|---|---|---|---|---|---|
| 1 | | | | | | |
| 3 | 4 | | | | | |
| B + 3 | B + 6 | B + 7 | | | | |
| 3B + 4 | 4B + 7 | 4B+10 | 4B+11 | | | |
| 4B + 1 | 7B + 5 | 8B + 8 | 8B+11 | 8B+12 | | |
| B | 5B+ 1 | 8B+ 5 | 9B+ 8 | 9B+ 11 | 9B+ 12 | |
| 2B+11 | 3B+11 | 7B+ 12 | 10B+ 16 | 11B+19 | 11B+ 22 | 11B+23 |

$T_{(2)}$ =

| | | | | | | |
|---|---|---|---|---|---|---|
| 2 | | | | | | |
| 5 | 7 | | | | | |
| 2 B | 2B+ 5 | 2B+ 7 | | | | |
| 4B + 4 | 6B+ 4 | 6B+ 9 | 6B+11 | | | |
| B | 5B+ 4 | 7B+ 4 | 7B+ 9 | 7B+11 | | |
| 3B+ 8 | 4B+ 8 | 8B+12 | 10B+12 | 10B+17 | 10B+ 19 | |
| 2B+ 6 | 5B+14 | 6B+14 | 10B+18 | 12B+18 | 12B+23 | 12B+25 |

RANDOM AND BURST ERROR-CORRECTING SYSTEMS UTILIZING SELF-ORTHOGONAL CONVOLUTION CODES

BACKGROUND OF THE INVENTION 1. Field of the Invention

This invention relates to random and burst error-correction in data transmission systems.

2. Description of the Prior Art

The need for accurate transmission and processing of digital data is well recognized in such areas as telegraphy, telephony, and computer and automation technology. A variety of methods have been developed for improving the accuracy of transmission. Such methods range from simple single-bit error-detecting schemes requiring the appending of a single bit to each data character or word to be transmitted to more elaborate schemes of error-correction requiring numerous interspersing of parity check bits among the information bits.

Arrangements have been developed to correct random errors (errors occuring randomly throughout the transmitted data), burst errors (errors occuring in "bunches") or both random and burst errors. Since telephone transmission lines are subject to both random and burst errors, considerable interest has centered on finding efficient arrangements for correcting both types of errors. Most prior arrangements for correcting either burst errors alone or both random and burst errors have required a large data storage capacity. This is because such arrangements generally require a rather large guard space of error-free digits between the error bursts in order to correct erroneous digits. Therefore, a large amount of received data normally must be stored prior to decoding.

One prior art system for correcting random or independent errors is disclosed in D.W. Hagelbarger U.S. Pat. No. 3,227,999; issued Jan. 4, 1966. The Hagelbarger system, which utilizes self-orthogonol convolution codes (although they are not so designed in the patent), employs a relatively simple encoder and decoder both of which include an information digit shift register connected to a parity check digit generating circuit. As indicated in the Hagelbarger patent these codes, and correspondingly the interconnections between the information digit shift registers of the encoder and decoder and their respective parity check digit generating circuits, may be defined by different triangles. In particular, certain entries of the difference triangle specify the stages of the information digit shift register of the encoder and decoder which are to be connected to the respective parity check digit generating circuit. It is possible to modify the Hagelbarger system so that burst errors may be corrected. This is done by multiplying the entries of the difference triangle which specifies the system by a constant number. The resulting difference triangle specifies larger information digit shift registers for the encoder and decoder and new interconnections between the information digit shift registers and the corresponding parity checking circuits. The effect of this is that the encoded sequences will now be interleaved to a degree defined by the contrast number. (Interleaving is a well-known technique for providing burst-error correction) This arrangement, however, as with other prior art arrangements, requires a relatively large guard space and consequently a rather large data storage capacity.

SUMMARY OF THE INVENTION

In view of the above described prior art arrangements, it is an object of the present invention to provide for correcting both random and burst errors in a data transmission system.

It is another object of the present invention to provide a random and burst error-correcting system having a small receiving terminal storage requirement.

Still another object of the present invention is to provide random and burst-error correcting systems in which the interconnections between the information digit shift register and the corresponding parity checking circuits may be defined by difference triangles constructed in accordance with a systematic procedure.

These and other objects of the present invention are realized in a specific illustrative system embodiment which includes a transmitting and a receiving terminal connected by a noisy communication channel. Information sequences are encoded at the transmitting terminal in a self-orthogonal convolution code of rate $(b-1)/b$ which is capable of correcting $t$ random errors and burst errors of B blocks in length, where a block is $b$ bits in length. As in the Hagelbarger system, the encoder of the transmitting terminal includes a multistage shift register for storing information signals and a parity check digit generating circuit connected to selected ones of the stages of the shift register. Unlike the Hagelbarger system, the stages to which the parity check digit generating circuit are connected may be determined by deriving one or more difference triangles which meet the requirements set forth below. The procedure for deriving the triangles is as follows.

First construct a difference triangle of order $\lambda = (b-1)t$ and of size $(b-1)(t+1)$ The rows of the triangle are then partitioned into $b-1$ groups of $t1$ rows each so that no more than $t$ repetitions of any entry appear in each group. New difference triangles are then generated from each of the $b-1$ groups be inserting $t-2$ zeros at the top of the first column of each group and expanding the column into a difference triangle. Each new triangle is reconstructed by multiplying each entry by B and incrementing various entries such that (1) each entry of all triangles is different from all other entries of all triangles and (2) the burst error-correcting capability is not diminished. The entries of the diagonals of the resulting triangles define the interconnections between the information digit shift register and the parity generating circuit of the encoder.

The encoded sequences are transmitted to a receiving terminal where they are there decoded by standard threshold decoding techniques. The decoder includes an information digit shift register, selected stages of which are connected to a parity checking circuit (just as in the encoder). The parity checking circuit is connected to a majority logic circuit and a syndrome shift register, selected stages of which are, in turn, connected to the majority logic circuit as determined by the difference triangles.

BRIEF DESCRIPTION OF THE DRAWINGS

A complete understanding of the present invention and of the above and other objects and advantages thereof may be gained from a consideration of the following detailed description of specific illustrative embodiments presented hereinbelow in connection with the accompanying drawings, in which:

FIGS. 4A through 4D show representations of the contents of various units of the FIG. 1A decoder at various time intervals during the decoding of the sequence shown in FIG. 3;

FIGS. 5A through 5C show representations of the contents of various units of the decoder of FIG. 2B at various time intervals during the decoding of the sequence of FIG. 3;

FIGS. 6A through 6N show the various stages of derivation of difference triangles for specifying an error-correcting system having a transmission rate of two thirds and capable of correcting up to four random errors and bursts of B blocks in length.

DETAILED DESCRIPTION

Figure 1A:
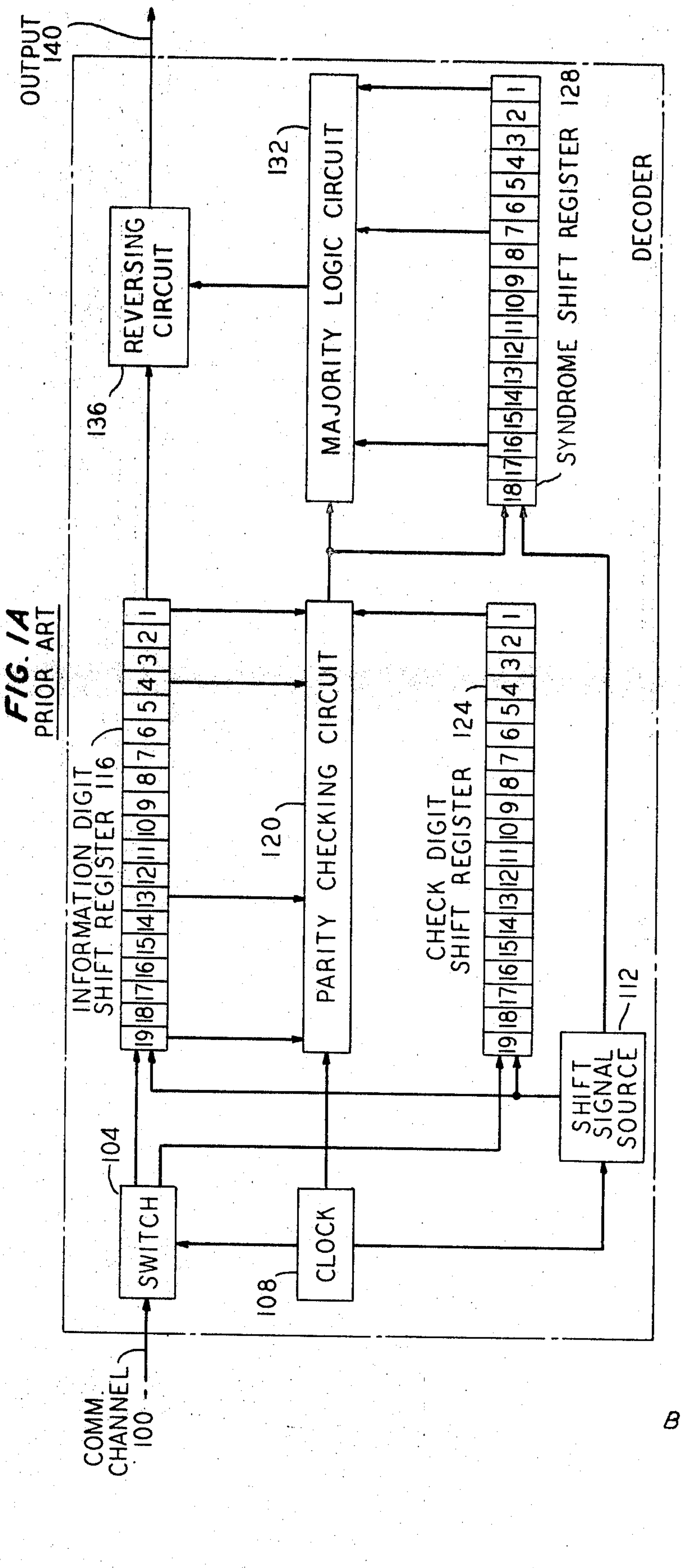
FIG. 1A PRIOR ART
FIGS. 1A through 1C show an illustrative prior art decoder for correcting random and burst errors and the difference triangles defining the decoder.

FIG. 1A shows an illustrative prior art decoder for decoding self-orthogonal convolution code sequences of rate one half. The decoder has been constructed in accordance with the disclosure of the aforecited Hagelbarger patent. The operation of the decoder and the appropriate encoder with which the decoder would operate are apparent from a reading of the Hagelbarger patent and will not be discussed in any detail here. As noted earlier and as discussed in the Hagelbarger patent, self-orthogonal convolution codes and the encoder and decoder for implementing such codes may be characterized or specified by difference triangles. For example, the difference triangle shown in FIG. 1B characterizes the encoder and decoder shown in FIG. 1 of the Hagelbarger patent. (It is noted that difference triangles may be oriented in a variety of ways. For example, the first column of entries in FIG. 1B triangle are the diagonal entries of the corresponding difference triangle in FIG. 3C of the Hagelbarger patent. The various orientations, however, are equivalent.)

Figure 1C:
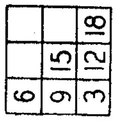
Figure 1B:
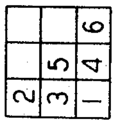

The decoder shown in FIG. 1A is characterized by the difference triangle of FIG. 1C which was obtained by simply multiplying each of the entries of the difference triangle of FIG. 1B by the numeral 3. The entries of the diagonal of the difference triangle of FIG. 1C specify the stages of the information digit shift register 116 which are connected to the parity generating circuit 120. Specifically, the sixth, fifteenth, and eighteenth stages from the leftmost stage (stage 19) are connected to the parity checking circuit 120. The leftmost stage of the shift register is always connected to the parity checking circuit. The diagonal entries of the difference triangle of FIG. 1C also indicate the interconnections between the syndrome shift register 128 and the majority logic circuit 132. Here, however, the stages connected are determined by counting from the rightmost stage of the register. Thus, the sixth and fifteenth stages from the rightmost stage of the shift register 128 (as well as the rightmost stage) are connected to the majority logic circuit 132. The interconnection which is indicated by the last entry (numeral 18) is connected directly from the parity checking circuit 120 (thus saving one stage of storage).

Although not shown, the difference triangle of FIG. 1C also specifies the interconnections between the shift register and parity checking circuit of the encoder that would be utilized with the decoder FIG. 1A.

As indicated earlier, when the entries of a difference triangle (such as that of FIG. 1B which characterizes a random error-correcting system) are multiplied by a constant $c$ a new difference triangle is obtained which characterizes a system capable of correcting the same number of random errors as the system specified by the first difference triangle and also burst errors of $c$ blocks in length. The system characterized by the difference triangle of FIG. 1B is capable of correcting a maximum of two random errors. By thus multiplying each of the entries of the triangle by 3, the difference triangle of FIG. 1C is obtained which characterizes a system capable of correcting not only two random errors but also burst errors of three blocks in length. A block in this case consists of two bits, an information bit and a parity bit. Thus, the decoder of FIG. 1A is capable of correcting up to two random errors and burst errors of three blocks in length. This decoder will later be compared with a decoder made in accordance with the principles of the present invention.

As indicated above and in the Hagelbarger patent, a starting point for deriving the systems described by Hagelbarger is to obtain a difference triangle of order one, i.e., a difference triangle in which no two entries in the triangle have the same value. The starting point for deriving systems of the present invention, on the other hand, is to first obtain a difference triangle of order greater than one. Specifically, for a code of rate $(b-1)/b$ and capable of correcting $t$ random errors and burst errors of the B blocks in length, where a block is $b$ bits in length, a difference triangle of order $\lambda=(b-1)\,t$ and of size $(b-1)(t+1)$ is first constructed. (In a difference triangle of order $(b-1)t$, each entry may appear up to $(b-1)t$ times.) The sum of the entries of the first column of the triangle should be as small as possible to minimize the size of the various shift registers utilized in the encoder and decoder. The rows of the triangle are then partitioned or grouped into $b-1$ groups of $t+1$ rows each such that not more than $t$ repetitions of any entry appear in each group. The last entry of each row selected for each group is then placed in a diagonal in order of ascending magnitude (starting with the upper-left entry and continuing to the lower-right entry) and the diagonal is expanded into a new difference triangle. From each of such $b-1$ new triangles derived, still another difference triangle is constructed by inserting $t-2$ zeros at the top of the first column of the triangle and expanding the column into a difference triangle. Each of these triangles is again reconstructed by multiplying the triangle by B and incrementing various entries until each entry of all triangles is different from all other entries of all triangles and so that the burst error-correcting capability is not diminished. This will be further discussed later.

An illustrative random and burst error-correcting system will now be derived in accordance with the principles of the present invention and a comparison made between this system and the prior art system shown in FIG. 1A.

Assume that a system is desired which utilizes a code having a rate $(b-1)/b=\frac{1}{2}$ and capable of correcting $t=2$ random errors and burst errors of $B=4$ blocks where a block is $b=2$ bits in length. The first step in deriving such a system is to obtain a difference triangle of order $\lambda=(b-1)\,t=(2-1)\,2=2$ and of size $(b-1)\,(t+1)=1\times 3=3$. A difference triangle meeting these requirements and having the smallest entries possible is shown in FIG. 2C.

The next step is to partition the triangle into $b-1$ groups of $t+1$ rows each, but in our case since $b=2$ and $t=2$, no further partitioning need be done. Thus, the next step is simply to multiply the entries of the triangle by $B=4$ to obtain the difference triangle shown in FIG. 2D. Various entries of the triangle are then incremented until all entries are different. This can be done for example by incrementing the second entry of the first column of the difference triangle of FIG. 2D by 1 and then by deriving new entries for the remaining columns. That is, the numeral 4 is changes to 5, the first entry of the second column is obtained by adding the first two entries of the first column, the second entry of the second column is obtained by adding the second two entries of the first column, and the only entry on the third column is obtained by adding all three entries of the first column. The resulting triangle is shown in FIG. 2E. As is evident from FIG. 2E all entries of the difference triangle are now different. Furthermore, the burst error-correcting capability is not diminished. That is, no burst of $B=4$ blocks will affect more than $t=2$ rows of the triangle. This is evident since the three rows do not all contain entries whose values are within a range of $B=4$ (of each other). Thus the triangle defines an acceptable random and burst error-correcting system.

Figure 2A:
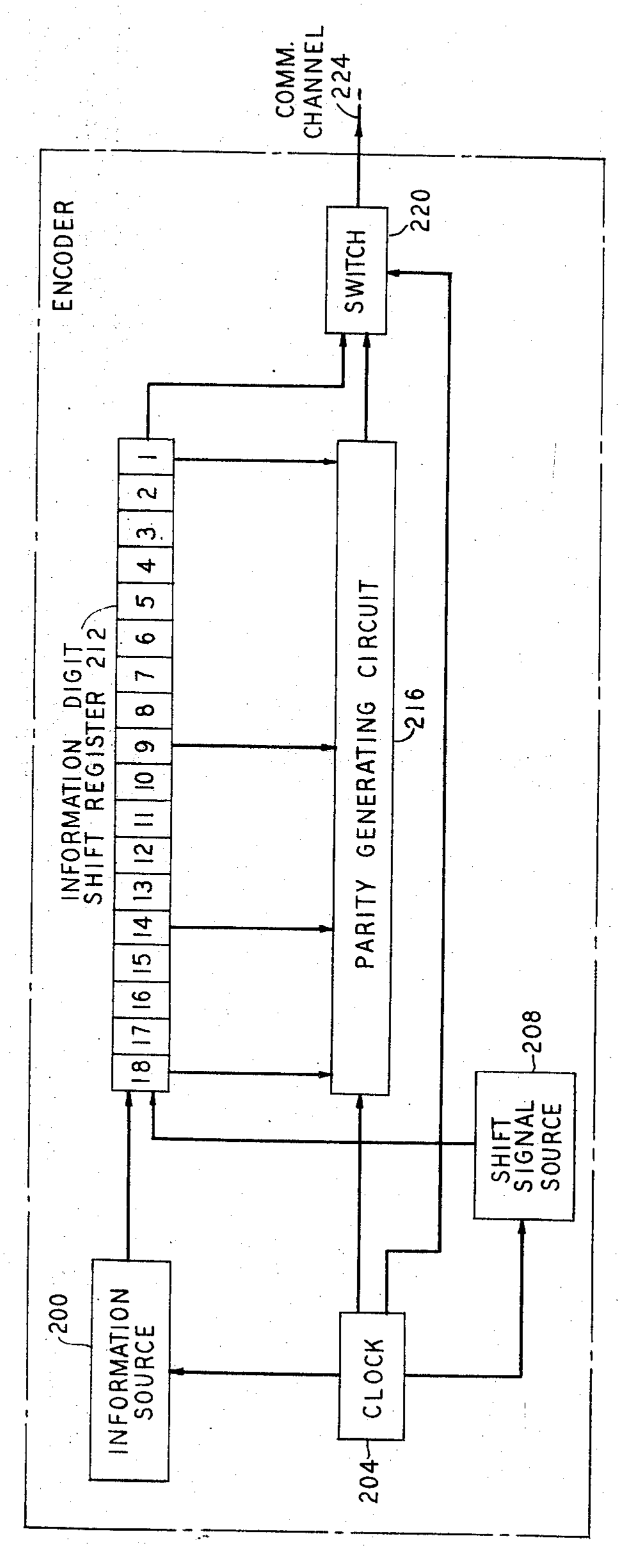
FIGS. 2A through 2E show an illustrative random and burst error-correcting system made in accordance with the principles of the present invention and the difference triangles defining the system.
Figure 2C:
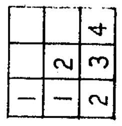
Figure 2D:
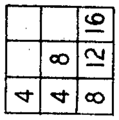
Figure 2E:
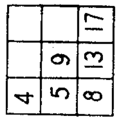
Figure 2B:
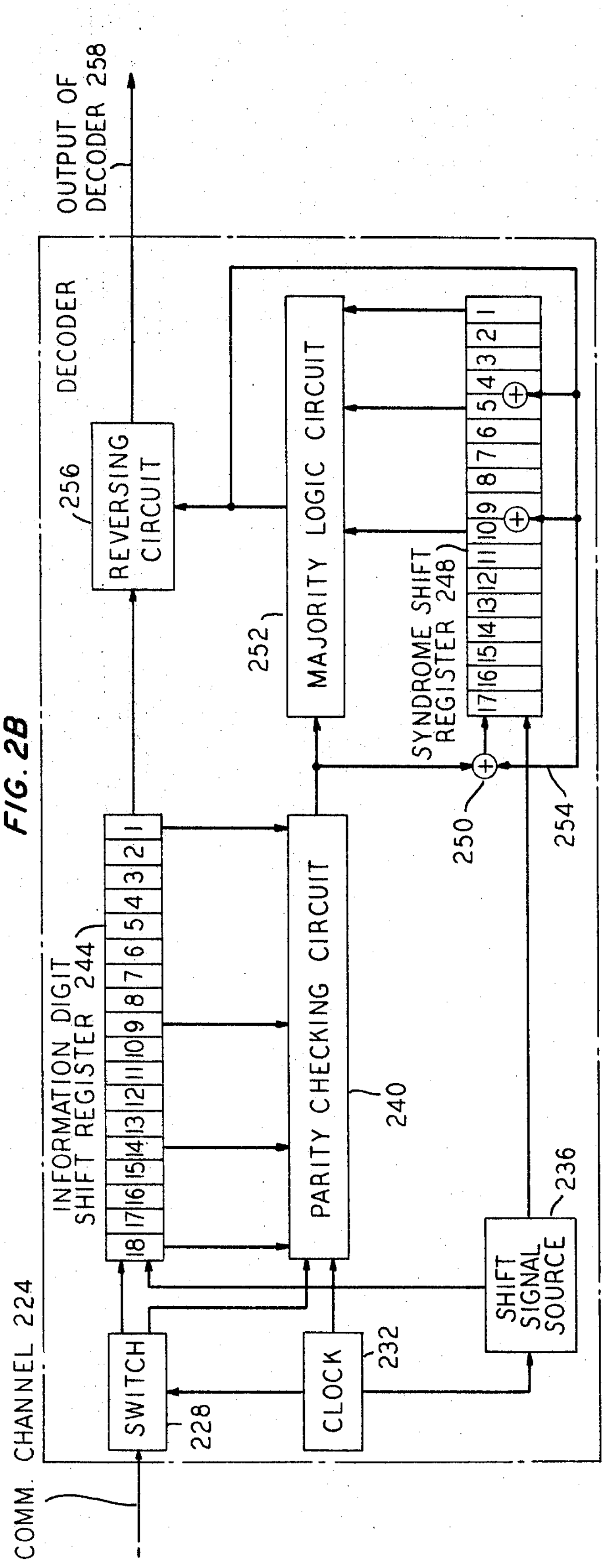

The error-correcting system defined by the difference triangle of FIG. 2E is shown in FIGS. 2A and 2B. The encoder of the system, shown in FIG. 2A, includes a source of information signals 200 connected to an 18 stage information digit shift register 212. The information source 200, in response to a clock 204, applies information digits to the information digit shift register 212, which, in response to shift signals from a shift signal source 208, successively shifts the information digits one stage at a time to the right. After each information digit is applied to the shift register 212, a parity generating circuit 216 generates a parity check digit from the contents of stages 1, 9, 14, and 18 of the shift register. This parity check digit is simply the modulo-2 sum of the contents of these designated stages. The stages connected to the parity generating circuit 216 are, of course, designated by the characterizing difference triangle shown in FIG. 2E. That is, the leftmost or stage 18 of the shift register 212 is connected to the parity generating circuit 216 along with the fourth, ninth, and seventeenth stages to the right of this stage as specified by the diagonal entries of the FIG. 2E triangle.

Information digits from the shift register 212 and parity digits from the parity generating circuit 216 are alternately applied to a communication channel 224 by a switch 220. Thus each information digit is separated from the succeeding information digit by a parity digit giving a transmission rate of one half.

The information digits and parity digits are then transmitted via the communication channel 224 to a decoder shown in FIG. 2B. Specifically, the information digits and check digits are applied to a switch 228 which alternately applied the information digits received to an information digit shift register 224 and the parity digits received to a parity checking circuit 240. After the receipt of each new information digit and the storage thereof in the shift register 244, the parity checking circuit 240 adds the contents of stages 1, 9, 14, and 18 of the shift register 244 with the next received parity digit to obtain a modulo-2 sum thereof. It will be noted that the stages of the shift register 244 connected to the parity generating circuit 240 correspond to those stages of the information shift register 212 which are connected to the parity generating circuit 216 of the encoder.

The modulo-2 sum obtained by the parity checking circuit is applied to a majority logic circuit 252 and a modulo-2 adder 250. The modulo-2 adder 250 adds this sum to the output of the majority logic circuit received via lead 254 and applies the resultant to a syndrome shift register 248. As the output of the modulo-2 adder 250 is applied to the syndrome shift register 248, the contents of the syndrome shift register are shifted one stage to the right and in the process of shifting, the contents of stage 10 is added to the output of the majority logic circuit (modulo-2) and the resultant applied to stage 9, and the contents of stage 5 are likewise added to the output of the majority logic circuit (modulo-2) and the resultant stored in stage 4. The stages of the syndrome shift register 248 connected to the majority logic circuit 252 and the stages whose contents are added to the output of the majority logic circuit are all specified by the difference triangle of FIG. 2C. Thus, the fourth (stage 5) and ninth (stage 10) stages to the left of stage 1 are designated stages as specified by the diagonal entries of the triangle. The FIG. 2C triangle also indicates that the seventeenth stage to the left of stage 1 should be connected to the majority logic circuit 252. But rather than having an unnecessary eighteenth stage, the output of the parity checking circuit is applied directly to the output of the majority logic circuit and also added directly to the output of the majority logic circuit by the modulo-2 adder 250 and then applied to stage 17. This eliminates the need for an eighteenth stage and thus provides a savings.

The majority logic circuit 252 applies a 1 to a reversing circuit 256 if more than half of the inputs to the circuit 252 are binary 1's. In response to receipt of a 1, the reversing circuit 256 reverses the value of the contents of stage 1 of the information digit shift register 244 as it is applied during the next shift interval to the output line 254. In this manner, up to two random errors and burst errors of up to four blocks in length (where a block consists of an information bit and a parity bit) may be corrected.

Figure 3:
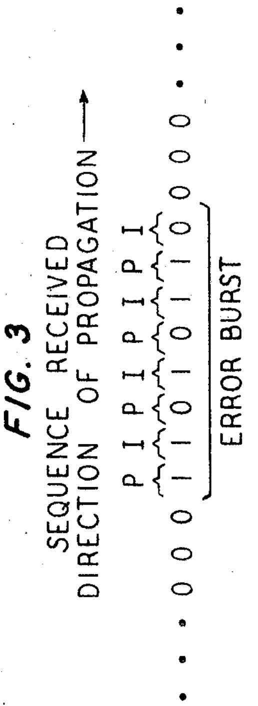
FIG. 3 shows a representation of an exemplary encoded and transmitted digital sequence.

An example will now be given comparing the error-correcting capability of the prior art decoder shown in FIG. 1A with the error-correcting capability of the system of FIGS. 2A and 2B. First of all, assume that a sequence of 0's has been transmitted and that during the course of the transmission certain of the 0's were were altered by an error burst as shown in FIG. 3. As indicated in FIG. 3, the error burst is of length four blocks where a block consists of an information bit identified by the letter I and a parity bit identified by the letter P. The positions in error are, of course, the positions having an 1. Now assume that this sequence is received by the decoder of FIG. 1A for decoding.

The switch 104 receives the first bit of the error burst which is an unaltered information bit 0 and applies this bit to the information digit shift register 116. The next bit received is the erroneous parity bit 1 which is applied to the check digit shift register 124. The parity checking circuit 120 calculates the modulo-2 sum of the contents of various stages of the information digit shift register 116 and the check digit shift register 124 and applies the resultant to the majority logic circuit 132 and the syndrome shift register 128. If more than half of the inputs to the majority logic circuit are 1, then the majority logic circuit signals the reversing circuit 136 (i.e. applies a 1 signal) to reverse the information digit to next emerge from the information digit shift register 116. All this has occurred over what will be considered one time interval.

The contents of the information digit shift register 116 and the syndrome shift register 128 during the above time interval are shown in FIGS. 4A and 4C, respectively. The output of the parity checking circuit 120 during the time interval is shown in FIG. 4C. Specifically, the information digit 0 which was received by the switch 104 and applied to the stage 19 of the information digit shift register 116 is shown in the row headed 1 and column headed 19 of the table of FIG. 4A indicating that the contents of stage 19 during the first time interval was a O. Nothing is shown in the remaining columns of row 1 indicating that the contents of the corresponding stages of the shift register 116 are 0's. The column headings identifying stages 19, 13, 4 and 1 are encircled in FIG. 4A indicating that these are the stages whose contents are applied to the parity checking circuit. Likewise, the contents of the syndrome shift register 128 and the output of the parity checking circuit 120 during the first time interval are shown in FIG. 4C. The absence of entries in the row corresponding to time interval 1, indicates that the output of the circuit 120 is 0 and the syndrome shift register 128 contains all 0's during this time interval.

In FIG. 4B, the contents of the clock digit shift register 124 are shown, but only in stages 1 through 5 and only for time intervals 19 through 22. Only these stages and time intervals need be considered for the example heregiven.

During time interval 2, the next block of the error burst of FIG. 3 consisting of the erroneous information digit 1 and the correct parity digit 0 are received by the switch 104 and applied to the information digit shift register 116 and the check digit shift register 124, respectively. As this is taking place, the contents of the information digit shift register 116 and the check digit shift register 124 are shifted one stage to the right. The contents of the information digit shift register 116 after this takes place are in FIG. 4A in row 2 (corresponding to the time interval 2). The parity checking circuit 120 then computes the modulo-2 sum of the input thereto to obtain a binary 1 resultant and applies the resultant to the majority logic circuit 132. Of course, since the majority of the inputs to the majority logic circuit 132 at this time are not 1's, there is a 0 output from the majority logic circuit 132 to the reversing circuit 136. The output of the parity checking circuit 120 is also applied to the syndrome shift register 128 so that during the next time interval of consideration i.e., time interval 3, the syndrome shift register 128 will contain a binary 1 in its eighteenth stage as indicated in FIG. 4C. This process continues with the receipt of other information and parity digits. The contents of the information digit shift registers 116 and the syndrome shift register 128 for the succeeding time intervals are shown in FIGS. 4A and 4C, respectively.

At time interval 20, as indicated in FIG. 4A, stage 1 of the information digit shift register 116 contains the erroneous information bit 1 which was the information bit of the second block of the error burst of FIG. 3. Since this binary 1 is the only binary 1 input to the parity checking circuit 120, the modulo-2 sum output of the parity checking circuit to the majority logic circuit during time interval 20 is a binary 1 (as shown in FIG. 4C). Thus, all inputs to the majority logic circuit 132 are binary 1's since, as also shown in FIG. 4C, the contents of stages 1, 6 and 16 of the shift register 128 contain binary 1's. So, during time interval 20, the majority logic circuit signals the reversing circuit 136 to reverse the erroneous information digit in stage 1 of the information digit shift register 116. The first erroneous information digit of the error burst of FIG. 3 is thus corrected by the FIG. 1A decoder. This is indicated in row 20 of FIG. 4D which shows the outputs of the majority logic circuit 132 at various time intervals.

In the same manner, the erroneous information digit of block 3 of the error burst of FIG. 3 is corrected. However, at time interval 22 when the erroneous information digit of the fourth block of the error burst is stored in stage 1 of the information digit shift register 116, there is also a binary 1 in stage 1 of the check digit shift register 124 (see FIG. 4B), and thus, the output of the parity checking circuit 120 is a binary 0 (see FIG. 4C). Further, since at time interval 22, stage 16 of the syndrome shift register 128 contains a 0, a majority of inputs to the majority logic circuit 132 will not be in 1's. Thus, the output generated by the majority logic circuit as indicated in FIG. 4D will not be a binary 1 as needed to correct the erroneous information digit in stage 1 of the register 116. This shows that the decoder of FIG. 1A is unable to correct error bursts of four (or more) blocks in length as stated earlier.

Figure 5B:
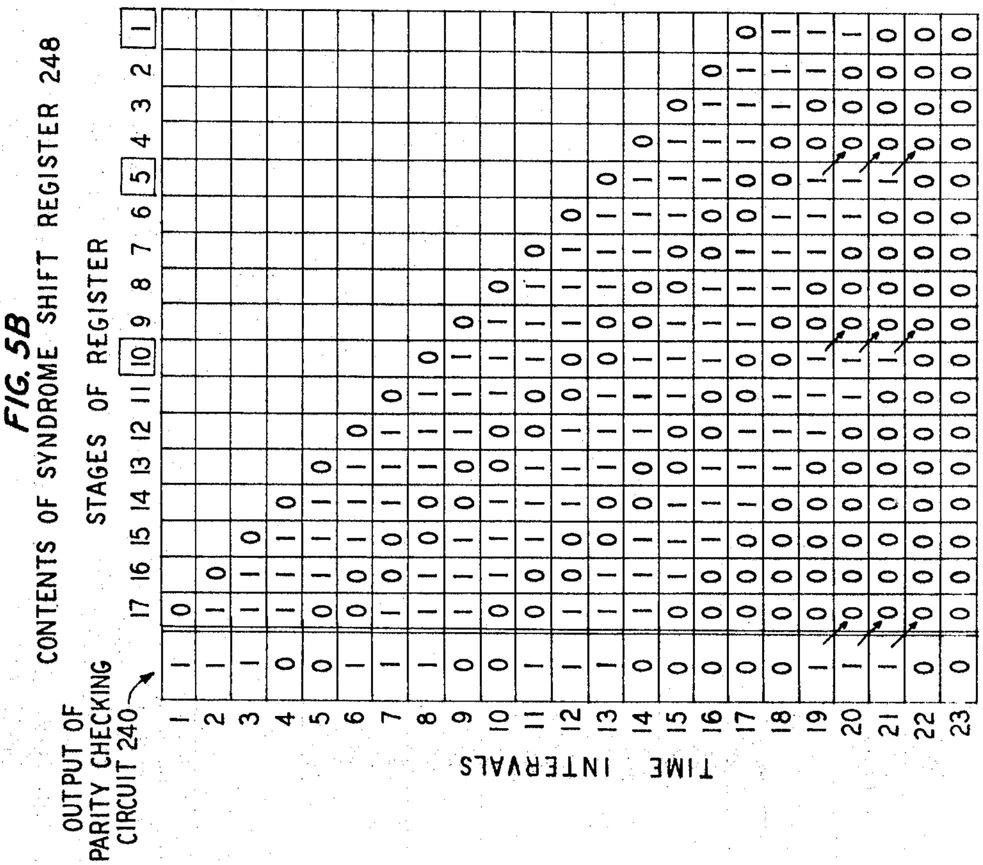
Figure 5A:
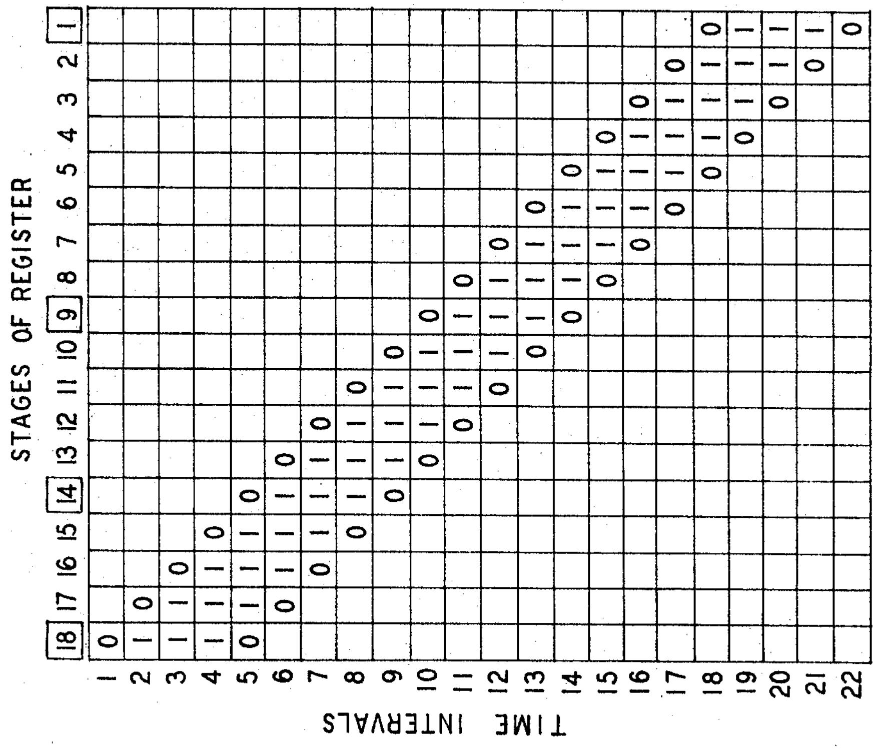

Now assume that the same digital sequence of FIG. 3 is received by the decoder of FIG. 2B. The contents of the information digit shift register 244 and the syndrome shift register 248 and the output of the majority logic circuit 252, during various time intervals of the processing of the received sequence are shown in FIGS. 5A, 5B and 5C, respectively. (The output of the parity checking circuit 240 for the various time intervals is shown in FIG. 5B). During time interval 19, as indicated in FIG. 5A, the first erroneous information digit of the error burst is stored in stage 1 of the information digit shift register 244. Since this is the only binary 1 input to the parity checking circuit 240, the modulo-2 sum input of the parity checking circuit to the majority logic circuit 252 is also a binary 1 (as shown in FIG. 5B). The other inputs to the majority logic circuit 252, i.e., from stages 1, 5, and 10 of the syndrome shift register 248, are likewise binary 1's as indicated in FIG. 5B for time interval 19. Thus the output of the majority logic circuit for this time interval, as shown in FIG. 5C is a binary 1 so that the erroneous information digit in stage 1 of the information digit shift register 244 will be corrected.

As shown in FIG. 2B, the binary 1 output from the majority logic circuit 252 is also added (modulo-2) to the output of the parity checking circuit 240 and to the contents of the stages 10 and 5 of the syndrome shift register 248 and the resultants thereof are stored in stages 17, 9 and 4 respectively. The digits affected by this addition are indicated by the arrows in FIG. 5B. The contents of the syndrome shift register 248 after this takes place is shown in FIG. 5B in row 20. During time intervals 20 and 21, the outputs of the majority logic circuit 252 are binary 1's thus causing the correction of the erroneous information digits of the third and fourth blocks of the error burst of FIG. 3. In this manner, the fourth block error burst of FIG. 3 is corrected by the FIG. 2B decoder.

As shown above, the system of FIGS. 2A and 2B is capable of correcting up to two random errors and burst errors of 4 blocks in length, while the prior art system of FIG. 1A, while capable of correcting up to two random errors, can only correct burst errors of length 3 blocks. Furthermore, as is apparent in comparing the decoders of FIGS. 1A and 2B, the amount of memory required for the prior art system is greater than that required for the system made in accordance with the present invention.

A more complex example illustrating the procedure for deriving an error-correcting system made in accordance with the present invention will now be given. Assume that a system is desired which will transmit data at a rate of two-thirds and which will correct up to $t=4$ random errors and bursts of $B$ blocks in length. (In this case a block will be 3 bits in length.) First of all, a difference triangle of order $\lambda=(b-1)\,t=8$ and of size $(b-1)(t+1)=10$ is generated. Such a triangle is shown in FIG. 6A. Note that the sum of the entries of the first column are as small as possible within the above requirements.

The triangle of FIG. 6A is next partitioned into $b-1=2$ groups of $t+1=5$ rows each so that no more than $t=4$ repetitions of any entry appear in each group. It is seen that by selecting those rows shown in FIG. 6A whose last entry is circled as one group and the remaining rows as the other group that the above requirement is met.

From each of the two groups selected, a new difference triangle is generated by placing the last entry of each row of the group in a diagonal order of ascending magnitude as shown in FIG. 6B and expanding the diagonal into a new difference triangle. The two resulting triangles are shown in FIG. 6B and are identified as $T_{(1)}$ and $T_{(2)}$. Each of the succeeding triangles to be derived from $T_{(1)}$ and $T_{(2)}$ will likewise be identified as $T_{(1)}$ and $T_{(2)}$, respectively.

Each of the triangles of FIG. 6B are then enlarged by placing $t-2=2$ zeros at the top of the first column of the triangle and expanding the column into a new difference triangle as shown in FIG. 6C. The entries of each of these triangles are then multiplied by $B$—the burst error capability desired—as shown in FIG. 6D.

The final step in deriving the needed difference triangles is to increment various entries of each of the triangles and then reconstruct new difference triangles until each entry is different from all other entries of the triangles and so that the burst error-correcting capability is not diminished. This incrementing may be done is any manner which achieves the desired result.

One general procedure for doing the incrementing which will ensure the desired result is as follows:

1. Replace the zeros at the top of each triangle by a subtriangle of order one and size $t-2$ and in which each entry of the subtriangle differs from all other entries of the other subtriangles. In choosing the subtriangles, it is desired that the largest entry of all diagonals of the subtriangles be as small as possible. The diagonal entries of the subtriangles will be referred to as spread numbers.
2. (This and the following steps of the procedure are to be done recursively). From the set of unspecified numbers (any $Bx$ where $x$ is any numeral) of the diagonals of the triangles, select the smallest entry. This entry is called a "choice" It is apparent from examining FIG. 6D that each choice will be larger than the previous choice by at least $B$. Each choice that differs from the previous choice by exactly $B$ is called a "primitive choiced."
3. Increment the current choice in such a way that the following three criteria are satisfied:
   a. The current increment must be no less than the previous increments. (The term "increments" as used here includes the entries of the subtriangles discussed above). The difference between the current increment and the previous increments is called the increment difference.
   2. Each new entry resulting from the current increment must be different from all entries thus far specified by the procedure. If this is satisfied, the selected increment is called valid.
   c. Of all primitive choices made, there must be at least one such choice for each spread number in each constituent triangle such that the increment difference for that choice is no less than the associated spread number.
4. After all increments have been made, the resulting triangles are combined to obtain a new triangle by placing all the diagonal entries of the constituent triangles in a single new diagonal in order to ascending magnitude. From this diagonal, a new difference triangle is generated. The constituent triangles from which each row of the new triangle was derived are noted, i.e., the constituent triangles from which the last entry of each row of the new triangle was taken are noted. The new triangle is inspected to determine if the burst error-correcting capability of the codes specified by the new triangle has been diminished. That is, the new triangle is inspected to see if any burst of $B$ blocks in length will effect more than $t$ rows derived from any constituent triangle. For example, if one row contained the entry $B+2$, then for the burst error-correcting capability of $B$ blocks to be maintained, there must not be more than $t-1$ other rows (derived from the same constituent triangle) which have entries in the range $B+2$ to $2B+1$. If this condition is not met, the triangle is repartitioned into its constituent triangles and an increment is added to the "offensive" entry and the incrementing procedure beginning with step 2 is repeated to thus obtain a revised set of constituent triangles. Steps 2 through 4 are repeated until triangles are obtained whose entries are all different and whose burst error-correcting capability is not diminished.

The above procedure will now be applied to the FIG. 6D triangles. Step 1 of the procedure requires that the 0 entries in each of the triangles of FIG. 6D be replaced by so-called subtriangles. The subtriangles chosen for this are shown in FIG. 6E. Note that the largest entry of either of the subtriangles of FIG. 6E—the numeral 7 of the second subtriangle—is as small as possible within the requirements of step 1. Note also that the spread numbers for $T_{(1)}$ are 1 and 4 and the spread numbers for $T_{(2)}$ are 2 and 7.

Applying step 2 to the FIG. 6D triangles, it is seen that the first choice is $B$ found in the diagonal of $T_{(1)}$. Step 3*a* requires that the increment to this choice be at least 7 (since the largest entry of the subtriangles which is also considered an increment is 7). The entry $B+7$ is then placed in the diagonal position previously occupied $B$ and then the other two entries of the row are generated as shown in the triangle $T_{(1)}$ of FIG. 6F. The next choice is 2B from the diagonal of $T_{(2)}$ of FIG. 6D. This also will be incremented by 7 and the other entries generated as shown in the triangle $T_{(2)}$ of FIG. 6F.

This procedure is continued to obtain the triangles of FIGS. 6G and 6H. For triangle $T_{(1)}$ shown in FIG. 6H, it was necessary to increment the choice $8B$ by 8 rather than 7 since 7 is not valid. That is, choosing 7 would have resulted in a duplication of entries. Since $8B$ is a "primitive choice" and since one the spread numbers of the corresponding subtriangle ($T_{(1)}$ of FIG. 6E) is 1 and the increment difference for the chosen increment is also 1, the chosen increment covers one of the spread numbers as required by step 3*b*.

For the next choice—9B of triangle $T_{(1)}$ of FIG. 6D—it is necessary to choose an increment of 9 since 8 is not valid. The resulting triangle is triangle $T_{(1)}$ shown in FIG. 6I.

For the next choice which is 10B of the diagonal of triangle $T_{(2)}$ of FIG. 6D, since it is a "primitive choice," it is desirable that the spread number 7 of the corresponding subtriangle ($T_{(2)}$ of FIG. 6E) be covered. Therefore an increment of 16 is chosen which gives an increment difference of 16−9−9=7. Likewise, the next choice—11B of the diagonal of triangle $T_{(1)}$ of FIG. 6D— is a primitive choice. By choosing an increment of 20, the increment difference (20−16=4) covers the spread number 4 of the corresponding sub-triangle and the increment is valid. The resulting triangle is triangle $T_{(1)}$ shown in FIG. 6J.

The final choice—12B of the diagonal of triangle $T_{(2)}$ of FIG. 6D—is also a primitive choice. The final spread number to be covered in the corresponding subtriangle ($T_{(2)}$ of FIG. 6E) is the entry 2, and therefore an increment of 22 is chosen giving an increment difference of 22−20=2. The resulting triangle is triangle $T_{(2)}$ shown in FIG. 6J.

The next step of the procedure (step 4) is to combine the two resulting triangles of FIG. 6J by placing the diagonal entries thereof in a new diagonal in order of ascending magnitude T shown in FIG. 6K and then by expanding the diagonal into a difference triangle such as is partially shown in FIG. 6L. The two columns of check marks shown to the right of the triangle of FIG. 6L specify those rows which were derived from entries of the $T_{(1)}$ or $T_{(2)}$ triangles of FIG. 6J. For example, the first row of the FIG. 6L triangle is from the constituent triangle $T_{(1)}$ while the second row was derived from the constituent triangle $T_{(2)}$, etc.

The FIG. 6L triangle is now examined in accordance with step 4 to see if any burst of $B$ blocks in length will effect more than $t=4$ rows derived from one of the constituent triangles. By inspection it can be seen that five of the rows derived from $T_{(1)}$ contain entries in the range $B+4$ to $2B+3$ (the circled entries) and therefore that a burst of $B$ blocks in length may not be correctable. However, if the $2B$ entry of the seventh row of the FIG. 6L triangle were incremented by 4, then this entry would not be within the range and the requirement would be met. With this in mind, the FIG. 6L triangle is repartitioned into its constituent triangles and the diagonal entry of $T_{(1)}$ from which the seventh row of the FIG. 6L triangle was derived is incremented by 4 and the remaining entries of the row generated as shown in FIG. 6M. Proceeding from here and assuming that the last choice was 4B, steps 2 and 3 of the procedure given above are applied to generate a new set of triangles $T_{(1)}$ and $T_{(2)}$, with choices again being made from the diagonals of the FIG. 6D triangles. The triangles ultimately obtained are shown in FIG. 6N. Applying step 4 to these triangles reveals that the burst error-correcting capability is not reduced, and thus the triangles shown are the desired triangles.

From the FIG. 6N difference triangles, a burst error-correcting system for any $B$ desired could, of course, be made. The connections from the information digit shift registers of the encoder and decoder to their respective parity checking circuits would be from the first, second, fourth, seventh, $B$+seventh, etc. stages of the shift registers in accordance with the diagonal entries of the two triangles of FIG. 6N. The interconnections between the syndrome shift register and majority logic circuit of the decoder would likewise be specified by the diagonal entries as heretofore indicated.

It is to be understood that the above-described embodiments are only illustrative of the application of the principles of the present invention. Numerous other modifications and alternative arrangements may be devised by those skilled in the art without departing from the spirit and scope of the invention.

I claim:

1. An encoder for encoding information signals in a binary self-orthogonal convolution code of rate $(b-1)/b$ and having a $t$ random error-correcting capability and a capability of correcting burst errors of $th$, blocks in length where a block is $b$ bits in length and $B$ is any positive integer, comprising:

a source of information signals;

a multistage shift register for storing said information signals and for successively shifting said signals therethrough, said register including an input stage and an output stage; and a parity check digit generating circuit connected to selected stages of said shift register for successively generating parity check signals from the contents of said selected stages, said selected stages including the input stage of said register and the $i^{th}$, $j^{th}$, etc. stages from said input stage where $i$, $j$, etc. are the diagonal entries of one or more final difference triangles derived in accordance with an algorithm wherein:

a difference triangle of order $\lambda=(b-1(t$ and of size $(b-1)(t+1)$ is constructed;

the rows of said triangle are partitioned into $b-1$ groups of $t=1$ rows each such that no more than $t$ repetitions of any entry appear in each group;

a reconstructed triangle is generated from each of the $b-1$ groups by inserting $t-2$ zeros at the top of the first column of each group and expanding each column into a difference triangle;

all entries of each reconstructed triangle are multiplied by $B$; and various entries are incremented to obtain the final difference triangles such that every entry of all triangles is different from all other entries of all triangles and such that the burst error-correcting capability is maintained at $B$ blocks.

2. The encoder of claim 1 in combination with a communication channel and means for alternately applying $b-1$ information signals and a parity check signal to said channel.

3. A combination as in claim 2 further including a decoder comprising:

a second multistage shift register including an input stage and an output stage;

a parity checking circuit connected to the input stage and the $i^{th}$, $j^{th}$, etc. stages from said input stage of said second shift register; and means connected to said communication channel for receiving information and parity signals applied thereto and for applying said parity signals to said parity checking circuit and said information signals to the input stage of said second shift register, said second shift register arranged to successively shift the information signals therethrough;

wherein said parity checking circuit generates an output signal corresponding to the modulo-2 sum of each parity signal and the contents of the $i^{th}$, $j^{th}$, etc. stages of said second shift register.

4. A combination as in claim 3 wherein said decoder further includes:

a multistage syndrome shift register including an input stage at one end and a first stage at the other end thereof;

a majority logic circuit responsive to the output of said parity checking circuit and to signals stored in selected stages of said syndrome shift register for generating a binary 1 output signal when more than half of the inputs to the majority logic circuit are binary 1 signals, said selected stages including the first stage of said syndrome shift register and the $i^{th}$, $j^{th}$, etc. stages from said first stage, where $i$, $j$, etc. include all but the largest of the diagonal entries of said final difference triangle(s); and a modulo-2 adder for generating the modulo-2 sum of the output said parity checking circuit and the output of said majority logic circuit and for applying said sum to said syndrome shift register, said syndrome shift register being further arranged to successively shift said sums therethrough.

5. A combination as in claim 4 wherein said syndrome shift register includes modulo-2 adders, each of which generates the modulo-2 sum of the output of said majority logic circuit and the signal stored in a different one of the $i^{th}$, $j^{th}$, etc. selected stages of said syndrome shift register and applies the sum so generated to the $(i-1)^{th}$, $(j-1)^{th}$, etc. stages respectively of said syndrome shift register upon each successive shift thereof.

6. A combination as in claim 5 wherein said decoder further comprises means responsive to the binary 1 output signal of said majority logic circuit for inverting the binary value of the output of said second multistage shift register.

7. An encoder as in claim 1 wherein the reconstructed triangle generated from each of the $b-1$ groups of $t+1$ rows each is obtained by placing the last entry of each row of each group in a diagonal with the other such entries of the rows of the group in order of ascending magnitude, expanding each such diagonal into a difference triangle, placing $t-2$ zeros at the top of the first column of each such difference triangle, and expanding each column into the reconstructed difference triangle.

8. An encoder as in claim 7 wherein the final difference triangles are obtained from the reconstructed triangles whose entries have been multiplied by $B$ by 1. replacing the zeros at the top of each reconstructed triangle by a subtriangle or order one and size $t-2$, wherein each entry of each subtriangle differs from all other entries of the other subtriangles, the diagonal entries of the subtriangles being referred to as spread numbers, and by recursively
2. selecting the smallest entry of the entries $Bx$, of the diagonals of the reconstructed triangles, where $x$ is any numeral, said selection being referred to as a "choice" and each "choice" which differs from the previous "choice" by exactly $B$ being referred to as a "primitive choice,"
3. incrementing the current "choice" so that
   a. the current increment is no less than the previous increments or the entries of the subtriangles, the difference between the current increment and the previous increments being referred to as the increment difference,
   b. each new entry resulting from the current increment is different from all entries thus far specified, and
   c. there is at least one "primitive choice" for each spread number such that the increment difference for that "-primitive" choice "primitive choice" is no less than the associated spread number, and
4. repeating steps (2) and (3) until all increments have been made and the resulting triangles specify a code having a burst error correcting capability of $B$ blocks.

9. In a data communication system in which information signals are encoded in a binary self-orthogonal convolution code of rate $(b-1)/b$ and capable of correcting $t$ random errors and burst errors of $B$ blocks in length where a block is $b$ bits in length, a decoder comprising:

a multistage information digit shift register for storing said information signals and for successively shifting said signals therethrough, said shift register including an input stage and an output stage; and a parity checking circuit connected to selected stages of said shift register for computing the modulo-2 sum of each parity check digit and the contents of said selected stages, said selected stages including the input stage of said register and the $i^{th}$, $j^{th}$, etc. stages from said input stage where $i$, $j$, etc. are the diagonal entries of one or more final difference triangles obtained by:

constructing a difference triangle of order $\lambda=(b-1)t$ and of size $(b-1)(t+1)$ partitioning the rows of said triangle into $b-1$ groups of $t+1$ rows each such that no more than $t$ repetitions of any entry appear in each group;

reconstructing a triangle from each of the $b-1$ groups by inserting $t-2$ zeros at the top of the first column of each group and expanding each column into a difference triangle;

multiplying the entries of each reconstructed triangle by $B$; and incrementing various entries to obtain the final difference triangles such that every entry of all triangles is different from all other entries of all triangles and such that the burst error-correcting capability is maintained at $B$ blocks.

10. In a data communication system, in accordance with claim 9, the decoder further comprising switching means for alternately applying a parity check digit to said parity checking circuit and $b-1$ information signals to said shift register.

11. In a data communication system, in accordance with claim 10, the decoder further comprising a multistage syndrome shift register which includes an input stage at one end and a first stage at the other end thereof, a majority logic circuit responsive to the modulo-2 sum output of said parity checking circuit and to signals stored in selected stages of said syndrome shift register for generating a binary 1 output signal when more than half of the inputs to the majority logic circuit are binary 1 signals, said selected stages including the first stage of said syndrome shift register and the $i^{th}$, $j^{th}$, etc. stages from said first stage where $i$, $j$, etc. include all but the largest of the diagonal entries of said final difference triangle(s), and a modulo-2 adder for generating the modulo-2 sum of the output of said parity checking circuit and the output of said majority logic circuit and for applying said sum to said syndrome shift register, said syndrome shift register being further arranged to successively shift said sum therethrough.

12. In a data communication system, in accordance with claim 11, the syndrome shift register including modulo-2 adders, each of which generates the modulo-2 sum of the output of said majority logic circuit and the signal stored in a different one of the $i^{th}$, $j^{th}$, etc. selective stages of said syndrome shift register and applies the sum so generated to the $(i-1)^{th}$, $(j-1)^{th}$, etc. stages from said first stage respectively of said syndrome shift register upon each successive shift thereof.

13. In a data communication system, in accordance with claim 12, the decoder further comprising means responsive to the binary 1 output signal of said majority logic circuit for inverting the binary value of the output of said information digit shift register.

14. An encoder comprising a $4B+2$ stage shift register including an input stage and an output stage, where $B$ is any positive integer, a parity check digit generating circuit connected to said input stage and to the $B^{th}$, $(2B+1)^{th}$, and $(4B+)^{th}$ stages from said input stage, a digital information source for applying signals to said input stage, a shift signal source for signaling said register to successively shift said applied signals therethrough, a communication channel, and a switch connected to said register and said parity check digit generating circuit for alternately applying an information signal and a parity check signal to said channel.

15. In a data communication system in which information signals are encoded in a binary self-orthogonal convolution code of rate one-half and capable of correcting two random errors and burst errors of $B$ blocks in length, where a block is 2 bits in length, a decoder comprising a $4B+2$ stage shift register including an input stage to which said information signals are applied and an output stage, a parity checking circuit connected to said input stage and to the $B^{th}$, $(2\ B+1)^{th}$, and $(4\ B+1)^{th}$ stages, from said input stage, a switch for alternately applying an information signal to said shift register and a parity check digit to said parity checking circuit, and a shift signal source for signaling said register to successively shift said applied information signals therethrough.

16. In a data communication system, in accordance with claim 15, the decoder further comprising a $4B+1$ stage syndrome shift register which includes an input stage at one end of said syndrome shift register and a first stage at the other end thereof, a first modulo-2 adder interconnecting the output of said parity checking circuit to the input stage of said syndrome shift register, and a majority logic circuit to which the output of said parity checking circuit and the contents of the first stage and the $B^{th}$ and $(2B+1)^{th}$ stages from said first stage of said syndrome shift register are applied for generating a binary 1 output signal when more than half of the inputs thereto are binary 1 signals.

17. In a data communication system, in accordance with claim 16, the decoder having the output of said majority logic circuit connected to said first modulo-2 adder and wherein said syndrome shift register includes a second modulo-2 adder for adding the output of said majority logic circuit and the contents of the $(2B+1)^{th}$ stage from said first stage and for applying the resultant obtained to the $2B^{th}$ stage from said first stage and a third modulo-2 adder for adding the output of said majority logic circuit and the contents of the $B^{th}$ stage from said first stage and for applying the resultant obtained to the $(B-1)$stage from said first stage.

18. In a data communication system, in accordance with claim 17, the decoder further comprising means responsive to the binary 1 output signal of said majority logic circuit for inverting the binary value of the contents of the output stage of said $4B+2$ stage shift register.

19. An encoder comprising a $12B+26$ stage shift register including an input stage and an output stage, where $B$ is any positive integer, a parity check digit generating circuit connected to said input stage and to the $1^{st}$, $2^{nd}$, $4^{th}$, $7^{th}$, $(b+7)^{th}$, $(2b+7^{th}$, $(4B+11^{th}$, $(6+11)^{th}$, $(7B+11)^{th}$, $(8B+12)^{th}$, $(9B+12)^{th}$, $(10B+19)^{th}$, $(11B+23)^{th}$, and $(12B+25)^{th}$ stages from said input stage, a digital information source for applying signals to said input stage, a shift signal source for signaling said register to successively shift said applied signals therethrough, a communication channel, and a switch connected to said register and said parity check digit generating circuit for alternately applying two information signals and a parity check signal to said channel.

20. In a data communication system in which information signals are encoded in a binary self-orthogonal convolution code of rate two-thirds and capable of correcting four random errors and burst errors of B blocks in length, where a block is three bits in length, a decoder comprising 12 $B+26$ stage shift register including an input stage to which said information signals are applied and an output stage, a parity checking circuit connected to said input stage and to the $1^{st}$, $2^{nd}$, $4^{th}$, $7^{th}$, $(B+7)^{th}$, $(2B+7)^{th}$, $(4B+11)^{th}$, $(6B+11)^{th}$, $(7B+11)^{th}$, $(8B+12)^{th}$, $(9B+12)^{th}$, $(10B+19)^{th}$, $(11B+23)^{th}$, and $(12B+25)^{th}$ stages from said input stage, a switch for alternately applying a parity check digit to said parity checking circuit and two information signals to said shift register, and a shift signal source for signaling said register to successively shift said applied information signals therethrough.

21. In a data communication system, in accordance with claim 20, the decoder further comprising a $12B+25$ stage syndrome shift register which includes an input stage at one end of said syndrome shift register and a first stage at the other end thereof, a first modulo-2 adder interconnecting the output of said parity checking circuit to the input stage of said syndrome shift register, and a majority logic circuit to which the output of said parity checking circuit and the contents of the first stage and the $1^{st}$, $2^{nd}$, $4^{th}$, $7^{th}$, $(B+7)^{th}$, $(2B+7)^{th}$, $(4B+11)^{th}(6B+11)^{th}$, $(7B+11)^{th}$, $(8B+12)^{th}$, $(9B+12)^{th}$, $(10B+19)^{th}$, and $(11B+23)^{th}$, stages from said first stage of said syndrome shift register are applied for generating a binary 1 output signal when more than half of the inputs thereto are binary 1 signals.

22. In a data communication system, in accordance with claim 21, the decoder having the output of said majority logic circuit connected to said first modulo-2 adder and wherein said syndrome shift register includes fourteen modulo-2 adders, each arranged to add the output of said majority logic circuit and the contents of a different one of the stages connected to said majority logic circuit excluding the first stage and for applying the resultant to the next adjacent stage in the direction of the first stage.

23. In a data communication system, in accordance with claim 22, the decoder further comprising means responsive to the binary 1 output signal of said majority logic circuit for inverting the binary value of the contents of the output stage of said $(12B+26)^{th}$stage shift register.